United States Patent [19]

Neiman

[11] 4,270,667
[45] Jun. 2, 1981

[54] CONVERSION RING FOR FILLERS

[75] Inventor: Michel Neiman, Paris, France

[73] Assignee: Societe de Diffusion NEIMAN, Courbevoie, France

[21] Appl. No.: 61,121

[22] Filed: Jul. 27, 1979

[30] Foreign Application Priority Data

Jul. 28, 1978 [FR] France ............................. 78 22346
Jul. 28, 1978 [FR] France ............................. 78 22347
Jul. 28, 1978 [FR] France ............................. 78 22348

[51] Int. Cl.³ .................... B65D 41/06; F16L 55/00
[52] U.S. Cl. ................................ 220/86 R; 220/301;
    220/DIG. 33; 285/81; 296/1 C
[58] Field of Search ....... 220/319, 301, 210, DIG. 33,
    220/DIG. 32, 293, 86 AT, 86 R; 70/158, 163,
    167, 169; 215/277, 223; 296/1 C; 285/81

[56] References Cited

U.S. PATENT DOCUMENTS

| 2,796,192 | 6/1957 | Nehls | 70/169 X |
| 2,801,767 | 8/1957 | Marjani | 220/293 X |
| 2,880,903 | 4/1959 | Nehls | 70/169 X |
| 3,289,442 | 12/1966 | Berger et al. | 220/293 X |
| 3,813,904 | 6/1974 | Wallskog | 220/DIG. 33 |
| 4,084,716 | 4/1978 | Bogert | 215/217 |

FOREIGN PATENT DOCUMENTS 2266 5/1931 Australia ................................ 220/210

Primary Examiner—Allan N. Shoap
Attorney, Agent, or Firm—James C. Wray

[57] ABSTRACT

A Conversion ring is provided for externally flanged mouths of tanks having two distinct locking means, one serving to prevent any axial displacement of the ring in relation to the filler mouth and the other for preventing any rotation of the ring once the latter is placed on the mouth. Both locking means cooperate with the external flange. The conversion ring provides security both as regards the sealing of the tank and as an anti-theft device.

4 Claims, 9 Drawing Figures

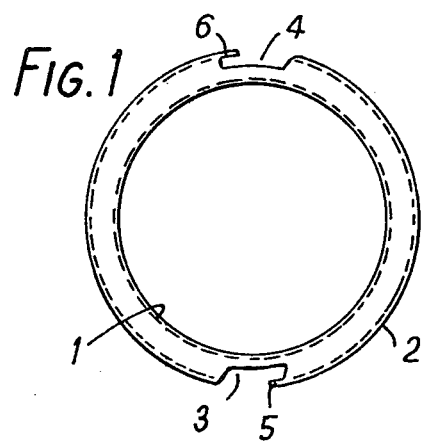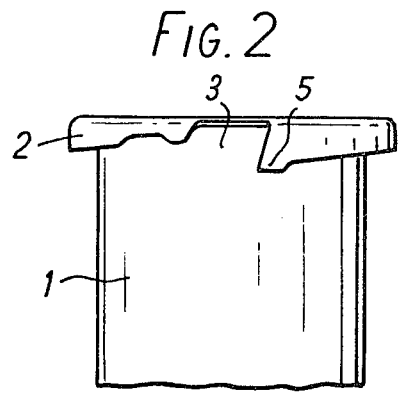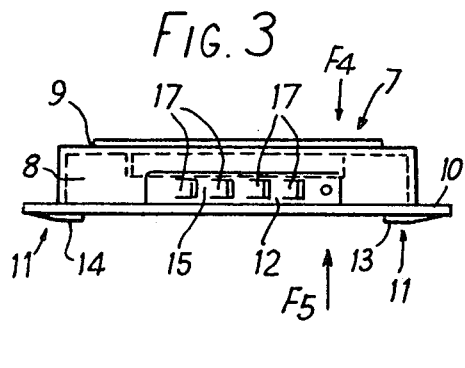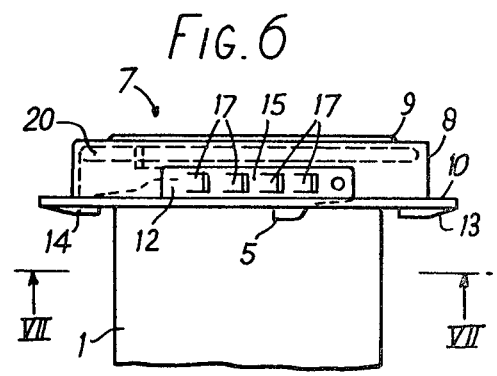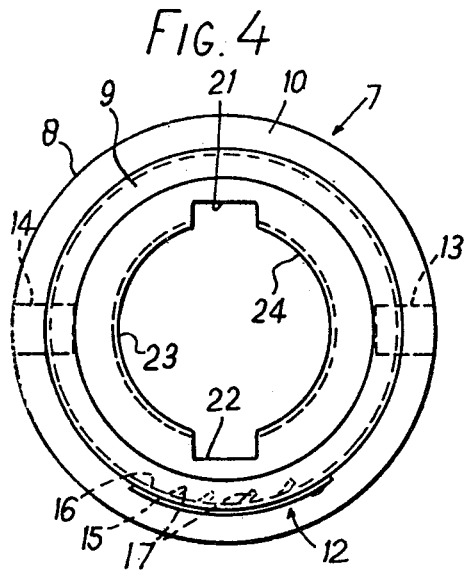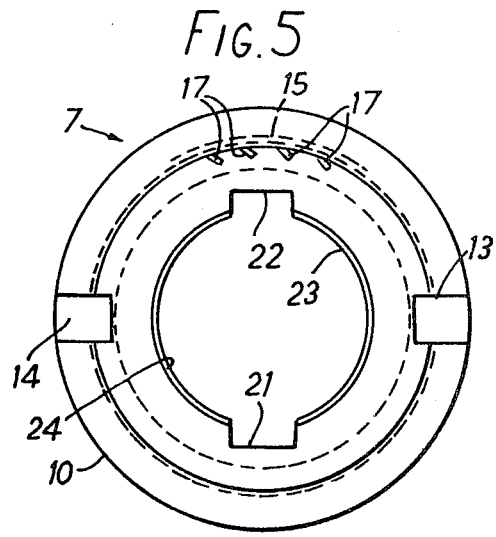

CONVERSION RING FOR FILLERS

BACKGROUND OF THE INVENTION

Various anti-theft caps for fuel tanks, more especially for automobile vehicles, are at present proposed on the market. Such caps comprise one or more locking members intended to engage with a flange of the mouth of the tank thus equipped. The control mechanism of these members is lodged in the deep body and operated by a key. As it is not possible infinitely to increase the diameter of such caps, the locking members must necessarily shift from the centre of the cap towards its periphery to come to engage with one or more elements of the mouth provided for this purpose. Such an arrangement presents no difficulty in so far as the mouths of the tanks to be protected are provided with an internal flange, which is the case with nearly 90% of the vehicles at present on the road. As regards the remaining 10%, which in reality represents a significant number, no satisfactory means has yet been proposed to permit the use of standard anti-theft caps. Attempts have in fact been made to use connector rings of plastic material forced around the external flange of the mouth to be equipped, but such rings have a tendency after a certain time to slacken, which eliminates the seal of the closure. It has also been proposed to use metallic rings fixed to the mouth by means of radial screws which in fact render illusory the protection offered by the lockable cap.

OBJECT OF THE INVENTION

The present invention has the purpose of diminishing the above-mentioned disadvantages by supplying a conversion ring which is extremely simple and of great security both as regards the sealing of the tank and as regards its theft-proofing.

SUMMARY OF THE INVENTION

According to the invention there is provided a conversion ring for fillers of tanks, said fillers being of the kind having an external flange formed with two diametrically opposed cut-away portions with inclined faces, said ring being formed by a cylindrical wall and a flange inwardly extending from said wall and shaped to receive a filler cap, comprising a first locking means for cooperation with said external flange to prevent axial displacement of the ring in relation to the filler, and a second locking means constituted by at least one appropriately orientated depressed portion provided at the annular wall of the ring, this depressed portion being intended to cooperate with the inclined face of at least one of the two diametrically opposed cut-away portions of the external flange to prevent rotation of the ring in relation to the filler once the ring is placed on the filler.

BRIEF DESCRIPTION OF THE DRAWINGS

In order to set forth the characteristics and advantages of the invention better, embodiments of the invention are described hereinafter by way of illustration, without restriction, reference being made to the accompanying drawings, wherein:

FIG. 1 is an end view of an automobile tank mouth provided with an external flange, FIG. 2 is an elevation of a mouth extremity as represented in FIG. 1, FIG. 3 is an elevation of a conversion ring according to the invention, FIGS. 4 and 5 are views in the directions of the arrows $F_4$ and $F_5$ respectively in FIG. 3, FIG. 6 represents the ring according to FIG. 3 placed on the mouth according to FIG. 2.

DESCRIPTION OF PREFERRED EMBODIMENT

Figure 7:
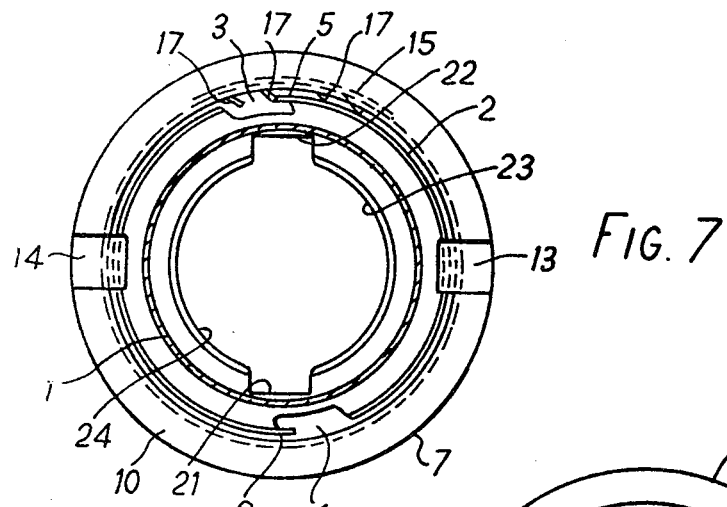
FIG. 7 is a section along the line VII—VII in FIG. 6.
Figure 8:
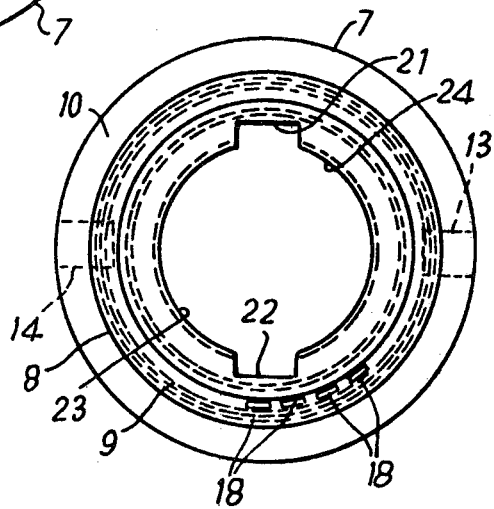
FIG. 8 is a plan view of another form of embodiment of a ring according to the invention.

As set forth above, the conversion ring according to the present invention is intended for fitting on mouths 1 having external flanges 2, with which especially the tanks of automobile vehicles are equipped, in order to obtain internally flanged mouths which can cooperate with standard anti-theft caps. These flanges 2 have two diametrically opposite cut-away portions 3 and 4, each of these cut-away portions comprising inter alia an incline 5 and 6 respectively. The conversion ring 7 has a cylindrical wall 8 the upper extremity of which is provided with an annular flange 9 intended to constitute the seating of an anti-theft cap of known type, and the lower part of which is provided with a security flange 10. This ring 7 is further provided with two distinct locking means indicated at 11 and 12 respectively. The first of these locking means is intended to oppose any axial displacement of the ring 7 in relation to the mouth 1, while the second is intended to limit the freedom of rotation of the said ring on the mouth. The means 11 in the present case are constituted by two diametrically opposite tongues 13 and 14 respectively, the free extremities of which are intended to engage beneath the flange 2 of the mouth 1. The locking means 12 is constituted in the present case by a curved strip 15 of spring steel fixed at one of its extremities to the said cylindrical wall 8 and extending in front of an aperture 16 provided for this purpose in the latter. The strip 15 has a plurality of inclined depressed portions 17 directed in the direction opposite to that of the rotation of the ring for its positioning. One or the other of these depressed portions 17 is intended to engage the inclined portion 5 or the inclined portion 6 respectively of one or the other of the said cut-away portions 3 and 4 once the said tongues 13 and 14 are engaged beneath the flange 2. In this manner any rotation in the direction opposite to that of the positioning is controlled by the engagement of one of the said protuberances 17 against one of the said inclines 5 and 6 respectively. As the cut-away portions 3 and 4 are prolonged over the upper part of the flange 2, the locking element 12 could equally be constituted by depressed portions 18 provided in the annular flange 9 and intended, one or the other, to engage the upper part of the said inclined portion 5 or 6 respectively.

Figure 9:
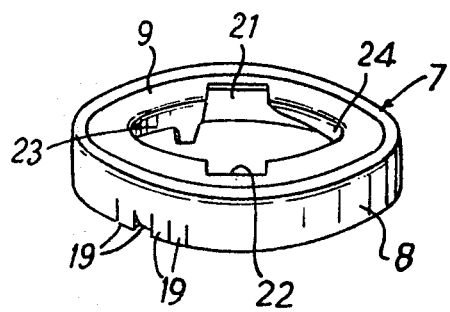
FIG. 9 is a perspective view of another form of embodiment again of a ring according to the invention.

Finally these means 11 can equally be constituted by bending of a part of the peripheral wall 8 after positioning of the ring on the mouth, a plurality of slots 19 being providable for this purpose as represented in FIG. 9. With the exception of the last example of embodiment as represented in FIG. 9, the rings according to the invention possess the advantage of necessitating absolutely no tool work for their positioning, which is effected in an easier rapid manner. These rings can further be easily removed.

As the said locking means 11 follow the lower edge of the flange 2 of the mouth 1, in the positioning of the ring, and this lower edge is inclined so as to present a progressively increasing height in the direction of screwing of the ring, the latter is thrust forcefully towards the said mouth. In order to ensure the sealing of the junction a sealing washer 20 will advantageously be disposed between the lower face of the said flange 9 and the upper face of the flange 2. This washer 20 will be compressed progressively in the positioning of the ring, for reasons set forth above, any leakage of the joint 20 being rendered impossible by the action of the above-mentioned locking means 12.

Furthermore due to the presence of several protuberances 17 the object is achieved that it still remains possible if necessary for any reason to re-tighten the ring according to the invention. In order to achieve the object that the conversion ring can cooperate with anti-theft caps intended to engage on internally flanged mouths, the said ring possesses on its upper annular face two diametrically opposite cut-away portions 21 and 22 respectively and an interrupted flange, 23 and 24 respectively, the lower edges of which are preferably inclined in the manner known per se.

I claim:

1. A conversion ring for fillers of tanks, said fillers being of the kind having an external flange formed with two diametrically opposed cut-away portions with inclined faces, said ring being formed by a cylindrical wall and a flange inwardly extending from said wall and shaped to receive a filler cap, comprising a first locking means for cooperation with said external flange to prevent axial displacement of the ring in relation to the filler, and a second locking means constituted by at least one appropriately orientated depressed portion provided at the annular wall of the ring, this depressed portion being intended to cooperate with the inclined face of at least one of the two diametrically opposed cut-away portions of the external flange to prevent rotation of the ring in relation to the filler once the ring is placed on the filler.

2. A ring according to claim 1, wherein the first locking means is constituted by two diametrically opposed inwardly directed tongues provided in the cylindrical wall.

3. A ring according to claim 1, wherein the depressed portion is constituted by a relatively elastic curved strip fixed at one extremity to the cylindrical wall of the ring and extending adjacent a cut-away portion in said wall, the strip being provided with at least one inclined portion.

4. A ring according to claim 1, wherein the lower end of the cylindrical wall is provided with an external flange situated substantially in a plane perpendicular to the axis of the ring.

* * * * *